Figure 1:
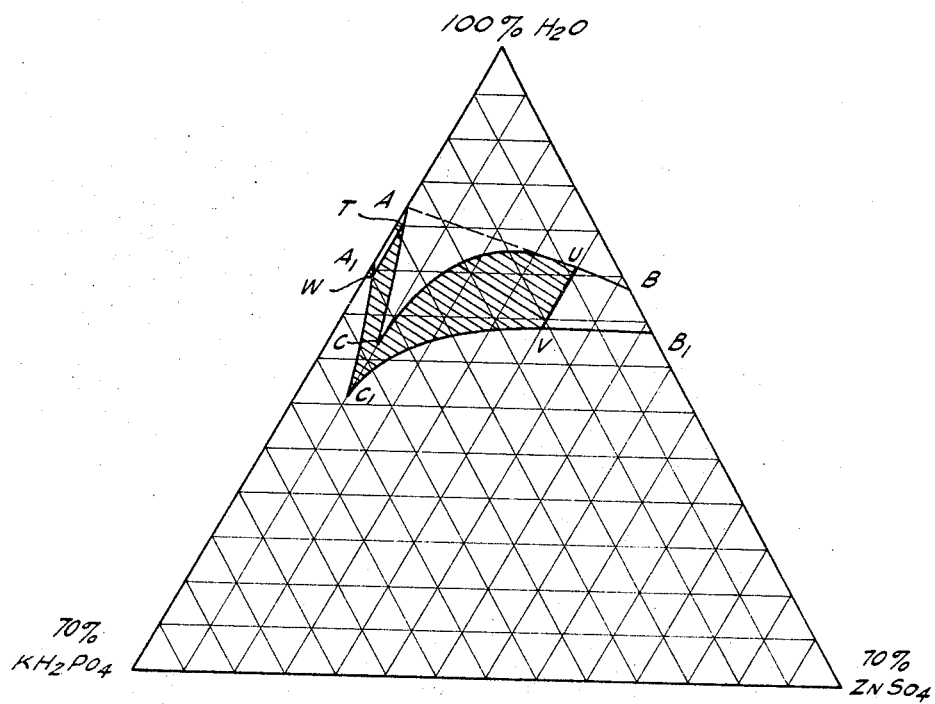

United States Patent
Backlund

[15] 3,663,198
[45] May 16, 1972

[54] INCREASED COMPONENT CONCENTRATION OF ZINC NUTRIENT SOLUTION

[72] Inventor: Peter Stanley Backlund, Anaheim, Calif.
[73] Assignee: Union Oil Company of California, Los Angeles, Calif.
[22] Filed: Nov. 12, 1969
[21] Appl. No.: 875,740

[52] U.S. Cl..................................71/34, 23/107, 71/1, 71/63, 71/64 C
[51] Int. Cl. ..........................................C05b 7/00
[58] Field of Search..................................71/1, 34, 63, 64 C

[56] References Cited

UNITED STATES PATENTS

| | | | |
|---|---|---|---|
| 2,270,518 | 1/1942 | Ellis et al. | 71/64 C X |
| 2,950,183 | 8/1960 | Nikitin et al. | 71/1 X |
| 2,976,138 | 3/1961 | Hester | 71/1 |
| 3,130,034 | 4/1964 | Young | 71/1 |

OTHER PUBLICATIONS

Liquid Fertilizer Manual, 1967– Chapter 5, page 2; & Chapter 17, page 1– published by National Fertilizer Solutions Association, Peoria, Ill.

*Primary Examiner*—Reuben Friedman
*Assistant Examiner*—Bennett H. Levenson
*Attorney*—Milton W. Lee, Richard C. Hartman, Lannas S. Henderson, Dean Sandford and Robert E. Strauss

[57] ABSTRACT

A solution suitable for application to plants and soil to correct zinc deficiencies is described which comprises an aqueous solution of zinc sulfate and mono-potassium or mono-ammonium hydrogen orthophosphate having an acidic pH value from about 1.5 to about 4, and wherein the components of the solution manifest a mutually increased solubility.

6 Claims, 2 Drawing Figures

PATENTED MAY 16 1972

3,663,198

INVENTOR.
PETER STANLEY BACKLUND
BY
ATTORNEY

INCREASED COMPONENT CONCENTRATION OF ZINC NUTRIENT SOLUTION

DESCRIPTION OF THE INVENTION

This invention relates to nutrient solutions and in particular relates to zinc-containing nutrient solutions suitable for correction of zinc deficiency in crops and soils.

One of the commonly encountered trace metal deficiencies in crops or soils is a zinc deficiency. While various solutions have been described for the preparation of zinc-containing solutions for correcting such deficiencies, heretofore, no solution has been described which supplies a mixture of nutrients comprising phosphorus in major quantities with lesser quantities of nitrogen, potassium, or mixtures thereof.

While the zinc-containing solutions of this invention can be used to correct zinc deficiencies at any time, it has been found that the solutions are of particular value in late season application, i.e., 20 to about 45 days prior to harvesting. It has been found that the application of these solutions, particularly those in which phosphorus is present in major proportions results in greatly enhanced late season growth, particularly when potassium or nitrogen are also present. Accordingly, this invention is directed to such zinc compositions and a method for their preparation.

I have found that ammonium or potassium dihydrogen orthophosphate, or mixtures thereof, in admixture with zinc sulfate in aqueous solution form eutectic compositions having greatly enhanced solubilities of the solids. This enhanced solubility increases the amount of the phosphate, e.g., approximately doubles the solubility of the phosphate, in the aqueous solution for any given salting out temperature. This enhanced solubility of a major nutrient in a zinc-containing nutrient solution is significant in that it permits the application of the major nutrient, i.e., phosphorus, in substantial quantities to the plant simultaneously with the application of the zinc to correct zinc deficiency.

Figure 2:
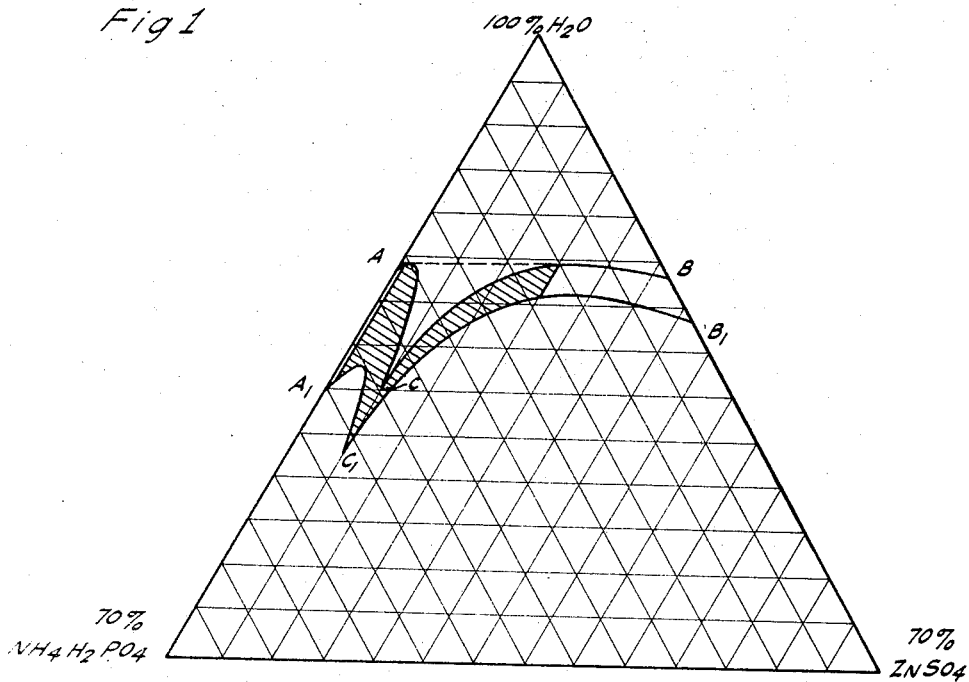

The solutions of this invention will be described by reference to the FIGURES of which:

FIG. 1 is a ternary diagram of the system of mono-potassium orthophosphate, water and zinc sulfate; and FIG. 2 is a ternary diagram for the system of mono-ammonium hydrogen orthophosphate, water and zinc sulfate.

Referring to FIG. 1, it can be seen that the zinc sulfate and mono-potassium hydrogen orthophosphate form eutectic compositions having greatly enhanced solubilities. The system depicted in FIG. 1 represents the system at a pH value of 2; however, this system is substantially identical to the systems having pH values in the range from about 1.5 to about 4 which are encompassed within this invention. As illustrated, the maximum solubility of mono-potassium hydrogen orthophosphate in water at 0° Centigrade is illustrated by point A as comprising about 18.5 weight percent of the solids. At 20° C. there is a slight increase in solubility to 23 weight percent solute, shown at $A_1$. Similarly, the maximum solubility of zinc sulfate in an aqueous solution at 0° C. is approximately 27 weight percent solute, shown at B while at 20° C. is approximately 31 weight percent solute, shown at $B_1$. The broken line A–B connecting the points A and B of the 0° isotherm represents the normally expected solubilities of these salts upon simple admixture of the solutions A and B. Thus, it would be expected, absent any synergistic effect on solubility exhibited by the combination, that the solutilities of the mixtures of the salts would fall along the straight line A–B. Contrary to this expectation, I have found that the combination of salts exhibits a synergistic effect on solubility and mixtures of solutions A and B will dissolve further quantities of solute so that the isotherm is substantially depressed, particularly for solutions containing about 5 percent zinc sulfate where, at point C, it can be seen that the total solute content of the solution is about 33 weight percent, considerably in excess of the solubilities of either of the individual components in the water. A similar effect can be illustrated at the 20° C. isotherm as represented by points $A_1$, $B_1$ and $C_1$ wherein a solution containing up to 38 weight percent solute is possible without exceeding the 20° C. salting out temperature.

Solutions falling within the scope of this invention therefore comprise those solutions having salting out temperatures no greater than 0° C. and comprising an aqueous solution of zinc sulfate and mono-potassium hydrogen orthophosphate with a pH value from about 1.5 to about 4 and the composition included within the area defined by lines A–B, B–C and C–A of FIG. 1. Other solutions embraced within the scope of this invention comprise those solutions having from 1 to about 20 weight percent zinc sulfate, from 5 to about 33 weight percent mono-potassium hydrogen orthophosphate and from 62 to about 80 weight percent water, in an amount sufficient to provide a salting out temperature of the solution from 0° to about 20° C. These compositions are encompassed within the shaded area defined by lines T–C, C–U, U–V, V–$C_1$ and $C_1$–W, appearing on FIG. 1. Of the solutions disclosed herein, the most preferred are those containing from 2 to about 10 weight percent zinc sulfate with a consequentially high content of mono-potassium orthophosphate.

Referring now to FIG. 2, the ternary system for the mono-ammonium orthophosphate, zinc sulfate and water can be seen. This system, as that previously described, also exhibits a eutectic point in solubility, i.e., the solutes exhibit synergistic solubilities. Thus the mono-ammonium orthophosphate has a maximum solubility in an aqueous solution at a pH from about 1.5 to 4 of about 26 weight percent at 0° C. and, at 20° C., approximately 40 weight percent. These points are shown as A and $A_1$ of FIG. 2. As with the previously described system, the solutions encompassed by my invention comprise those solutions containing zinc sulfate and mono-ammonium orthophosphate and contained within the area defined by the lines A–B, B–$B_1$, $B_1$–$C_1$, $C_1$–$A_1$ and $A_1$–A. It is these solutions which exhibit an unexpectedly low salting out temperature for any given solute concentration which is lower than the expected salting out temperature if the solubilities were simply combined additively.

Particularly preferred solutions are those having from 1 to about 15 weight percent zinc sulfate, from 10 to about 42 weight percent mono-ammonium orthophosphate and from 53 to 74 weight percent water. These solutions are shown in the shaded area appearing on FIG. 2. Of these solutions, and of the solutions within the area A–B–C–A, the most preferred are those containing from 2 to about 10 weight percent zinc sulfate with consequentially high contents of mono-ammonium orthophosphate.

Although not separately shown, similar ternary systems occur when the ammonium or potassium dihydrogen orthophosphate solute is replaced with a mixture of ammonium and potassium orthophosphate. Such systems, while being quaternary systems, can be depicted on a tertiary diagram at any constant ratio of the ammonium to the potassium salt and have solubilities intermediate the two extremes shown in FIGS. 1 and 2.

The aforementioned solutions are employed with an acidic pH, i.e., a pH from 1.5 to about 4.0, preferably from 2 to 3. The dihydrogen orthophosphate solutes have a slightly acid pH when dissolved in an aqueous solution. Their pH, however, is lowered to the aforementioned values by the incorporation in the solution of a minor amount of a mineral acid such as sulfuric acid, phosphoric acid, nitric acid, or a hydrohalic acid, e.g., hydrochloric, hydrobromic, hydroiodic, or hydrofluoric. Of the aforementioned acids, the nitric, sulfuric and phosphoric are preferred and of these the sulfuric and phosphoric are most preferred. The amount of the mineral acid which is added to the solutions to lower the pH to the desired value can be from about 0.05 to about 5.0 weight percent, preferably from about 0.1 to about 2 weight percent. To avoid confusion of the contents of the solutes in the various solutions, all the solute concentrations are presented herein on an acid-free basis, it being understood, however, that such solutions also contain the aforementioned quantities of acids.

The preferred use of the aforementioned solutions comprises the foliar application of the solutions to crops late in the growing season, e.g., at a period within about 20 to 45 days prior to the harvesting. The solutions can be applied in undiluted concentration or, if desired, can be admixed with from 0.1 to about 10 gallons of water per gallon of the aforementioned solution. The solutions are applied at a dosage sufficient to provide from about 0.01 to about 0.5 pounds zinc per acre, preferably from about 0.1 to about 0.2 pounds zinc per acre. In alternative applications, the solutions can be applied at the aforementioned dosages directly to the soil or can be applied at any time prior to or during the growing season of the particular crop. In such uses the solutions can be applied to correct known or suspected deficiencies of zinc in the soil before a zinc deficiency appears or can be applied whenever the zinc deficiency becomes apparent by an abnormal growth pattern of the crop.

The aforementioned solutions are compatible with most nutrient solutions and can be blended therewith in any desired proportion. Thus the aforementioned solutions can be blended with from about 1 to about 25 gallons per gallon of the solution of various nutrient solutions such as aqueous solutions of ammonium nitrate, urea, mixtures thereof, e.g., Uran, urea formaldehyde solutions such as UF–85, ammonium phosphate solutions, e.g., an 8–24–0 composition, ammonium sulfate solutions, etc. The aqueous solutions can also be mixed with various suspensions of supersaturated solutions of the aforementioned nutrient solutes or suspensions of various fertilizer solids such as triple superphosphate, superphosphate, acidulated and pulverized phosphate rock, etc.

The following will illustrate various compositions encompassed within the invention:

TABLE

| Solution | Concentration, weight percent | | | | | | | |
|---|---|---|---|---|---|---|---|---|
| | $ZnSO_4$ | $KH_2PO_4$ | $NH_4H_2PO_4$ | $H_2O$ | $NH_4NO_3$ | 8-24-0 | $(NH_4)_2SO_4$ | Urea |
| 1 | 5 | 33 | | 62 | | | | |
| 2 | 5 | 28 | | 67 | | | | |
| 3 | 10 | 20 | | 70 | | | | |
| 4 | 3 | 25 | | 72 | | | | |
| 5 | 15 | 10 | 5 | 70 | | | | |
| 6 | 15 | 10 | | 75 | | | | |
| 7 | 4 | | 47 | 49 | | | | |
| 8 | 5 | | 40 | 55 | | | | |
| 9 | 7 | | 30 | 63 | | | | |
| 10 | 10 | | 31 | 59 | | | | |
| 11 | 4 | 27 | | 59 | 10 | | | |
| 12 | 3 | 18 | | 64 | 15 | | | |
| 13 | 8 | 16 | | 58 | | | 18 | |
| 14 | 7 | 7 | | 56 | 10 | 5 | | 5 |
| 15 | 10 | 7 | | 63 | | 20 | | |
| 16 | 3 | | 40 | 47 | | 10 | | |
| 17 | 6 | | 18 | 46 | 30 | | | |
| 18 | 5 | | 40 | 40 | | | | 15 |
| 19 | 3 | 10 | 30 | 57 | | | | |
| 20 | 7 | 15 | 15 | 63 | | | | |

The aforementioned illustrative compositions are not intended to unduly limit the invention, but rather it is intended that all obvious equivalents to such compositions which are described herein or obvious equivalents of solutions described herein are within the scope of the invention.

I claim:

1. An aqueous fertilizer solution consisting essentially of water, at least 1 weight percent of zinc sulfate solute, at least 5 weight percent of a phosphorus solute selected from the class consisting of mono-potassium hydrogen orthophosphate and mono-ammonium hydrogen orthophosphate, and a sufficient quantity of mineral acid to impart to said solution a pH of between about 1.5 and 4; the concentration of said combined solutes in said solution being (1) greater than the additive concentrations of an aqueous solution saturated at 0° C. with said phosphorus solute, combined with an aqueous solution saturated at 0° C. with said zinc sulfate solute, and (2) less than the salting out concentration at a temperature of 20° C.

2. The solution defined in claim 1 wherein said mineral acid is nitric, sulfuric, or phosphoric acid.

3. The fertilizer solution of claim 1 wherein said phosphorus solute is mono-ammonium hydrogen orthophosphate.

4. The fertilizer solution of claim 1 wherein said phosphorus solute is mono-potassium hydrogen orthophosphate.

5. The fertilizer solution of claim 1 wherein said phosphorus solute is mono-potassium hydrogen orthophosphate and said combined solutes are present at a concentration greater than the saturated concentration of said solutes at 0° C. and less than the saturated concentration of said solutes at 20° C.

6. The fertilizer solution of claim 1 wherein said phosphorus solute is mono-ammonium hydrogen orthophosphate and said solutes are present at a concentration greater than the saturated concentration of said solutes at 0° C. and less than the saturated concentration of said solutes at 20° C.

* * * * *